United States Patent [19]
Glider et al.

[11] Patent Number: 5,388,243
[45] Date of Patent: Feb. 7, 1995

[54] MULTI-SORT MASS STORAGE DEVICE ANNOUNCING ITS ACTIVE PATHS WITHOUT DEACTIVATING ITS PORTS IN A NETWORK ARCHITECTURE

[75] Inventors: Joseph S. Glider, Mountain View; Thomas E. Idleman, Santa Clara, both of Calif.

[73] Assignee: MTI Technology Corporation, Anaheim, Calif.

[21] Appl. No.: 491,434

[22] Filed: Mar. 9, 1990

[51] Int. Cl.6 .................. G06F 12/00; G06F 13/00
[52] U.S. Cl. .................... 395/425; 395/325; 364/228.1; 364/228.3; 364/236.2; 364/236.3; 364/238.4; 364/248.1; 364/248.2; 364/256.8; 364/244.8; 364/DIG. 1
[58] Field of Search ................... 395/325, 425

[56] References Cited

U.S. PATENT DOCUMENTS

| | | | |
|---|---|---|---|
| 3,303,482 | 2/1967 | Jenkins | 340/174.1 |
| 3,544,777 | 12/1970 | Winkler | 235/153 |
| 3,693,159 | 9/1972 | Hilberg | 340/172.5 |
| 3,772,652 | 11/1973 | Hilberg | 340/172.5 |
| 3,803,560 | 4/1974 | DeVoy et al. | 340/172.5 |
| 3,905,023 | 9/1975 | Perpiglia | 340/172.5 |
| 3,917,933 | 11/1975 | Scheuneman et al. | 235/153 |
| 3,999,163 | 12/1976 | Levy et al. | 340/172.5 |
| 4,007,448 | 2/1977 | Sergeant et al. | 340/172.5 |
| 4,047,157 | 9/1977 | Jenkins | . |
| 4,070,704 | 1/1978 | Calle et al. | . |
| 4,093,985 | 6/1978 | Das | . |
| 4,101,969 | 7/1978 | Lawson et al. | . |
| 4,144,583 | 3/1979 | Lawson et al. | . |
| 4,183,084 | 1/1980 | Lawson | . |
| 4,207,609 | 6/1980 | Luiz et al. | . |
| 4,339,804 | 7/1982 | Davison et al. | . |
| 4,342,079 | 7/1982 | Stewart et al. | . |
| 4,464,747 | 8/1984 | Groudan et al. | 371/50 |
| 4,467,421 | 8/1984 | White | . |
| 4,468,731 | 8/1984 | Johnson et al. | . |
| 4,490,785 | 12/1984 | Strecker et al. | 364/200 |
| 4,507,730 | 3/1985 | Johnson et al. | . |
| 4,509,115 | 4/1985 | Manton et al. | . |
| 4,652,993 | 3/1987 | Scheuneman | 395/425 |
| 4,667,326 | 5/1987 | Young et al. | 371/40 |
| 4,722,085 | 1/1985 | Flora et al. | 371/38 |
| 4,747,047 | 5/1988 | Coogan et al. | 395/425 |
| 4,761,785 | 8/1988 | Clark et al. | 371/51 |
| 4,768,193 | 8/1988 | Takemae | 371/10 |
| 4,800,483 | 1/1989 | Yamamoto et al. | 364/200 |
| 4,807,180 | 2/1989 | Takeuchi et al. | 364/900 |
| 4,814,982 | 3/1989 | Weir | . |
| 4,817,035 | 3/1989 | Timsit | . |
| 4,825,403 | 4/1989 | Gershenson et al. | . |
| 4,825,406 | 4/1989 | Bean et al. | 364/900 |
| 4,849,929 | 7/1989 | Timset | . |
| 4,888,686 | 12/1989 | Sander et al. | 395/325 |
| 4,914,656 | 4/1990 | Dunphy, Jr. et al. | . |
| 5,072,378 | 12/1991 | Manka | 395/575 |

FOREIGN PATENT DOCUMENTS

| | | | |
|---|---|---|---|
| 0059842 | 9/1982 | European Pat. Off. | G06F 3/04 |
| 0369707 | 11/1989 | European Pat. Off. | . |
| 56-94593 | 7/1981 | Japan | . |
| 56-163596 | 12/1981 | Japan | . |
| 56-169297 | 12/1981 | Japan | . |
| 57-111890 | 7/1982 | Japan | . |
| 57-111893 | 7/1982 | Japan | . |
| 57-195397 | 12/1982 | Japan | . |
| 58-83400 | 5/1983 | Japan | . |
| 60-156152 | 8/1985 | Japan | . |
| 61-99999 | 5/1986 | Japan | . |
| 63-265348 | 11/1988 | Japan | G06F 13/10 |
| 8910594 | 11/1989 | WIPO | 395/425 |

OTHER PUBLICATIONS

Program Summary, DataStorage 86, An International Forum, Sep. 22-24, 1986, Red Lion Inn, San Jose, California.

(List continued on next page.)

Primary Examiner—Parshotam S. Lall
Assistant Examiner—Ayni Mohamed
Attorney, Agent, or Firm—Mark D. Rowland; Joseph M. Guiliano

[57] ABSTRACT

A network-type data processing system is provided. The system can support multiple simultaneous exchanges of data, and includes multi-port storage devices in which all ports can be active at all times. On initialization of the system, each storage device can announce itself through all of its ports simultaneously.

16 Claims, 16 Drawing Sheets

OTHER PUBLICATIONS

Product Description, Micropolis 1804 SCSI Parallel Drive Array, Document No. 108120 Rev A.

W. Jilke, "Disk Array Mass Storage Systems: The New Opportunity," Amperif Corporation, dated Sep. 30, 1986.

W. Jilke, "Economics Study of Disk Array Mass Storage Systems: The Cost Reduction Opportunity," Amperif Corporation, dated Mar. 24, 1987.

D. Patterson et al., "A Case For Redundant Arrays of Inexpensive Disks (RAID)," Report No. UCB/CSD 87/391, Dec. 1987.

D. Patterson et al., "A Case for Redundant Arrays of Inexpensive Disks (RAID)," ACM SIGMOD Conference, Chicago, Illinois, Jun. 1-3, 1988.

Michelle Y. Kim, "Synchronized Disk Interleaving," IEEE Transactions On Computers, vol. C-35, No. 11, Nov. 1986.

D. Lieberman, "SCSI-2 Controller Board Builds Parallel Disk Drive Arrays," Computer Design, vol. 28, No. 7, Apr. 1, 1989, pp. 32, 36.

W. Meador, "Disk Array Systems," Spring COMPCON 89 Digest of Papers, IEEE Computer Society Press, pp. 143-146.

T. Olson, "Disk Array Performance In A Random IO Environment," Computer Architecture, vol. 17, No. 5, Sep. 1989, pp. 71-77.

H. Sierra, "Assessing the promise of disk arrays," Canadian Datasystems, May 1989, pp. 52-53.

D. Simpson, "RAIDs vs. SLEDs." Systems Integration, Nov. 1989, pp. 70-82.

J. Voelker, "Winchester disks reach for a gigabyte," IEEE Spectrum, Feb. 1987, pp. 64-67.

MULTI-SORT MASS STORAGE DEVICE ANNOUNCING ITS ACTIVE PATHS WITHOUT DEACTIVATING ITS PORTS IN A NETWORK ARCHITECTURE

BACKGROUND OF THE INVENTION

This invention relates to communication in a data processing system. In particular, this invention relates to communication in a data processing system including multi-port mass storage devices. More particularly, this invention relates to communication in a data processing system in which a plurality of main processing units, multi-port mass storage devices, and device controllers are arranged in a network configuration.

Mass storage devices—i.e., tape and disk drives, and more commonly disk drives—are the primary storage devices for permanent data in electronic digital computer systems. For purposes of discussion, only disk drives will be referred to hereafter, it being understood that any mass storage technology—i.e., hard disk, floppy disk, optical disk, tape, cache memory or other technology—can be substituted. Disk drives communicate with the computer system through one or more connections which are both physical and logical and are referred to as ports. More than one storage device can be operated such that controllers and main processing units perceive several devices to be a single storage device or storage unit. As referred to hereafter, a "storage unit" may be a single storage device, or multiple devices that are recognized as a single storage device, or part of a device or devices recognized as a single device.

Communications between a disk drive and the main processing unit of the computer system are usually handled by an intermediary device known as a controller. The controller translates the logical instructions and requests of the main processing unit into simpler, more physical device oriented commands of the drive, as well as relaying any messages that the drive may have for the main processing unit. In addition, there are messages that pass between the controller and the drive that are independent of the main processing unit.

A disk drive (or storage unit) may have more than one port. Such drives are referred to as "multi-port" drives. A multi-port drive is capable of communicating with the computer system even if one of its ports is disabled for any reason, simply by communicating through a different port. However, it may not be possible for it to communicate with all parts of the system, depending on which controllers are connected through which ports, and how those controllers are connected to the rest of the system.

In a system with more than one controller, it is desirable to connect the different ports of a multi-port disk drive to different controllers. That way, if a controller is disabled, it will still be possible for the main processing unit or units to communicate with any associated drives through other controllers, although certain known multi-port drives are capable of having only one port active, for purposes of normal data movement, at any one time, so that a controller connected to an inactive port of the drive cannot communicate with the drive for purposes of normal data movement until something causes the drive to deactivate its current port and activate a new port.

Main processing units in a computer system maintain "paths" of communication to other devices in the system. A main processing unit will store configuration information that lets it know through which paths it can communicate to its devices. A path is defined by data structures in the machine (e.g., the main processing unit, device controller, storage device set or individual storage device) which needs to communicate with another machine. Generally, a path is ONLINE, AVAILABLE, or OFFLINE.

Computer systems having a plurality of main processing units, controllers and storage units exist in different architectures and configurations. In one type of system architecture, known as channel architecture, the main processing unit communicates with the storage unit by way of one or more controllers through one or more channels. In another type of system architecture, the main processing units, controllers, and storage units are connected in a network configuration, and the various components communicate using packet switching techniques such as those used in local area networks and public switched data networks.

When such systems are turned on or otherwise initialized, the main processing units become aware of the available storage units and the various paths to those storage units. In some systems, that information is entered by an operator into a table, and the table is loaded from memory when the system is turned on, with the operator making any necessary changes. In other systems, each main processing unit may broadcast a message for all devices to identify themselves, and those messages would be answered by all devices that could communicate with that main processing unit. In still other systems, each device on power-up broadcasts a message that it is available, and any main processing unit that hears that message knows that that device is available.

In the latter two types of systems, the ability to have all paths to all devices properly announced may be limited if not all ports of a multi-port device can be active at once. Multi-port devices all of whose ports can be active at once are known in channel architecture systems, but in such systems the announcement of paths is not usually a concern. On the other hand, in a previously known network architecture system having multi-port devices, only one port can be active at any one time. In such systems, the controllers take charge of the path announcement function, each controller instructing each storage unit under its control to announce itself through its current port, and then to temporarily deactivate its current port and activate each of its other ports and announce itself through each of those ports to any other controllers to which it is connected, before reactivating its current port. The controllers then announce all available devices to the main processing units on the network. In such systems, each storage device only communicates, for purposes of normal data movement, through one of the two ports (assuming a two-port device), and only switches ports in the event of a hardware failure. This means that all main processing units wishing to move data to or from the device burden one of the two controllers, while the other controller receives none of the burden. To relieve this burden, operators may manually set some of the storage devices to communicate through one port while setting the rest of the storage devices to communicate through the other port, thereby achieving some measure of distribution of workload through the controllers.

It would be desirable to be able to provide a multi-port storage unit in a network architecture system which can have any or all of its ports active at any time. This would give the capability to main processing units to dynamically distribute the workload associated with one unit to the various controllers that it is attached to. It could also allow a controller that was least busy to handle a particular data transfer at the point that the unit is ready for that transfer. Such a multi-ported storage unit would be especially advantageous in a network in which two or more simultaneous data exchanges are possible. The possibility of a main processing unit not being able to move data to or from a device would be diminished not only by the availability of multiple paths to or from a main processing unit to a controller (if one is busy, the other may be used) but also by the availability of multiple controllers that can be used to move data to or from a storage unit (if one is busy, the other can be used).

It would also be desirable to be able to provide such a system in which a storage unit could announce itself without having to deactivate any active ports.

SUMMARY OF THE INVENTION

It is an object of this invention to provide a multi-port storage unit in a network architecture system which can have any or all of its ports active at any time. It is also an object of this invention to provide such a system in which a storage unit can announce itself without having to deactivate any active ports.

In accordance with the present invention, there is provided a data processing system including at least one main processing unit, at least one mass storage unit, a plurality of controllers for controlling the at least one mass storage unit and interfacing between the at least one mass storage unit and the at least one main processing unit, and a data communications bus interconnecting the at least one main processing unit, the at least one mass storage unit and the plurality of controllers in a network configuration. The at least one mass storage unit has a plurality of ports for communicating with the controllers, at least two of the plurality of ports being capable of being active at any one time, and at least one each of the at least two ports being connected to a different one of the plurality of controllers. Thereby (a) a plurality of the at least one main processing unit can communicate with at least one of the at least one mass storage unit via the network over a plurality of paths simultaneously, and (b) each one of the at least one mass storage unit can communicate with the at least one main processing unit through at least two paths.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

The present invention is most advantageously used in network environment having a network communications bus capable of carrying two or more data exchanges at once. Although usable in a system capable of carrying only one data exchange at a time, the advantages of full-time access to all ports of a multi-port storage unit are diminished if the communications bus cannot accommodate multiple exchanges at one time.

Figure 1:
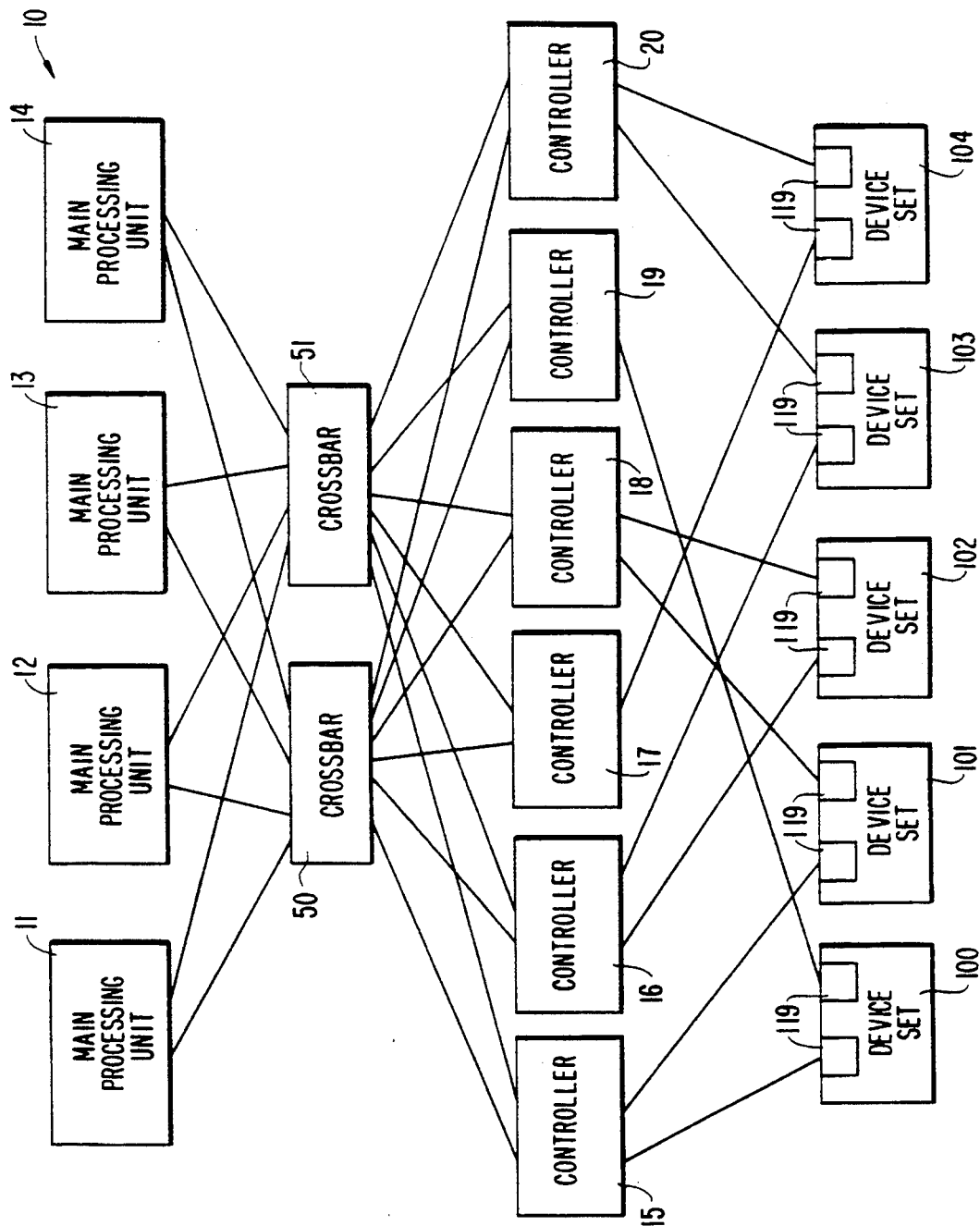
FIG. 1 shows a computer system in a network configuration, the computer system incorporating the present invention.

FIG. 1 shows a representative network configuration 10 with which the present invention can be used, having main processing units 11–14, device controllers 15–20 connected to main processing units 11–14 via network crossbars 50, 51, and device sets 100–104 connected to controllers 15–20. Each device set has two ports 119, both of which are active at all times. In a preferred embodiment, device sets 100–104 are disk drive sets.

Although individual network configurations may vary, in configuration 10, each device controller 15–20 is capable of controlling, and is connected to, multiple device sets 100–104. Each device controller 15–20 is also capable of communicating with all main processing units 11–14. Similarly, each main processing unit 11–14 can address all controllers 15–20.

Each device set 100–104 may be configured as one or more storage units, or as part of a storage unit encompassing more than one device set. A preferred method for dynamically configuring mass storage data on a set of storage devices to operate the device set as one or more logical storage units is described in co-pending U.S. patent application Ser. No. 07/488,749 entitled "DATA STORAGE APPARATUS AND METHOD" filed on Mar. 2, 1990 now U.S. Pat. No. 5,166,939 in the names of David H. Jaffe, David T. Powers, Kumar Gajjar, Joseph S. Glider and Thomas E. Idleman, which is hereby incorporated by reference in its entirety.

Figure 2:
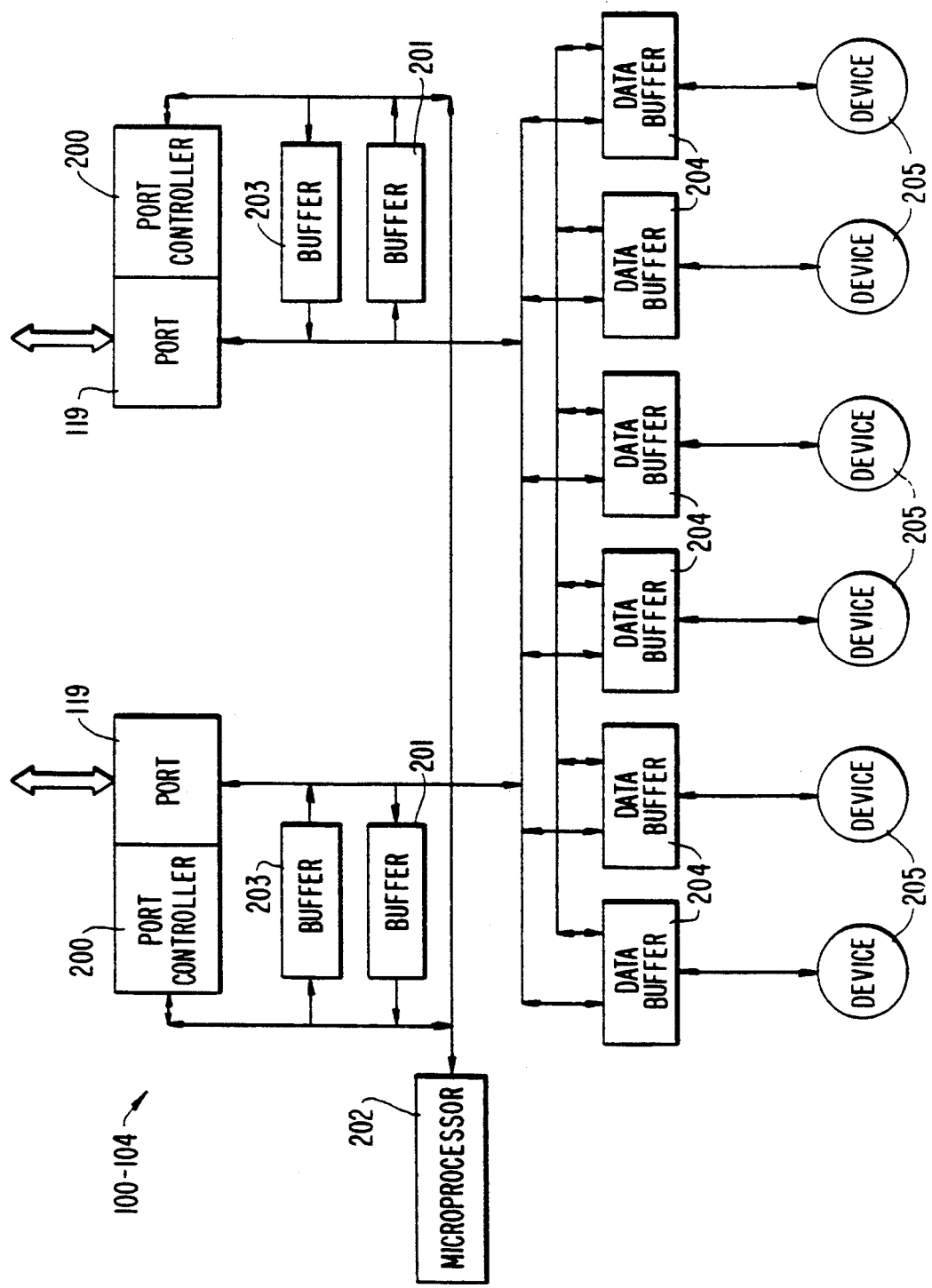
FIG. 2 shows a multi-port device set configurable as one or more storage units with which the present invention can be used.

FIG. 2 shows an example of a device set, such as one of device sets 100–104 of FIG. 1, comprising a plurality of individual physical storage devices 205 (e.g., disk drives) and two ports 119 through which commands and data can pass. For purposes of the following discussion, it is assumed that devices 205 of the device set 100–104 of FIG. 2 are configured together as a single storage unit (although other configurations also may be used). Each port 119 is controlled by an intelligent port controller 200. Each port controller 200 is dedicated to servicing the port 119 to which it is connected, and has the ability to complete the transmission or reception of a packet over the bus connected between its respective port 119 and the controller (15-20) to which the port is connected. Port controller 200 also controls the sequencing of interface protocols which allow data to be transferred between ports 119 and controllers 1520. When receiving command packet data, port controller 200 causes the received packet to pass from port 119 to a buffer 201. A microprocessor 202 causes the packet to be transferred to the microprocessor's internal memory, where it is read and interpreted.

Each of device sets 100-104 has a microprocessor 202 which monitors the two port controllers 200. Microprocessor 202 receives signals, from port controllers 200, indicating new incoming packets, and reads and interprets the packets, thereby leaving port controller 200 free to receive more packets. Microprocessor 202 also gives packets to port controllers 200 through a buffer 203 to transmit to controllers 15-20. Port controllers 200 cause the packet to be transmitted, and notify microprocessor 202 of completion. Microprocessor 202 can also command port controller 200 to transmit or receive data from one or more data buffers 204. Port controller 200 notifies microprocessor 202 of completion.

The two port controllers 200 of a given device set 100-104 operate independently of one another. They do not depend upon each other for timing data transfers. The asynchronous and parallel nature of the two port controllers 200, which are monitored and controlled by a single microprocessor 202, permits each port 119 of a device set 100-104 to actively transmit or receive data while the other port 119 of the device set is transmitting or receiving data.

Each storage device 205 can transfer mass storage data through either one of the two ports 119 connected to two different controllers 15-20, and, as stated above, both ports are active at all times. Therefore, if both controllers to which a particular device set is connected are connected to any main processing units in common, those main processing units have redundant paths to those devices. For example, main processing unit 13 can communicate with device set 104 through both controller 17 and controller 20, with device set 103 through both controller 16 and controller 20, and with device set 102 through both controller 16 and controller 18. As a result of having a storage unit comprising multiple storage devices 205, data to and/or from the storage unit can be transferred over both ports 119 simultaneously to two different controllers.

Each main processing unit 11-14, controller 15-20, and device set 100-104 must determine which of the devices contained in device sets 100-104 it may communicate with, and which paths it may use to communicate with the device. Each of these components (i.e., main processing unit 11-14, controller 15-20, and device set 100-104) builds its own data structures, known as unit control blocks ("UCB"), for each storage unit that it can access. Each UCB typically includes the storage unit characteristics (e.g., speed, size, name, and error statistics), a pointer to the active commands of the storage unit, and other information specifically required by the main processing unit 11-14, controller 15-20, or device set 100-104 that is building the UCB. The various types of UCBs are discussed below.

Figure 3:
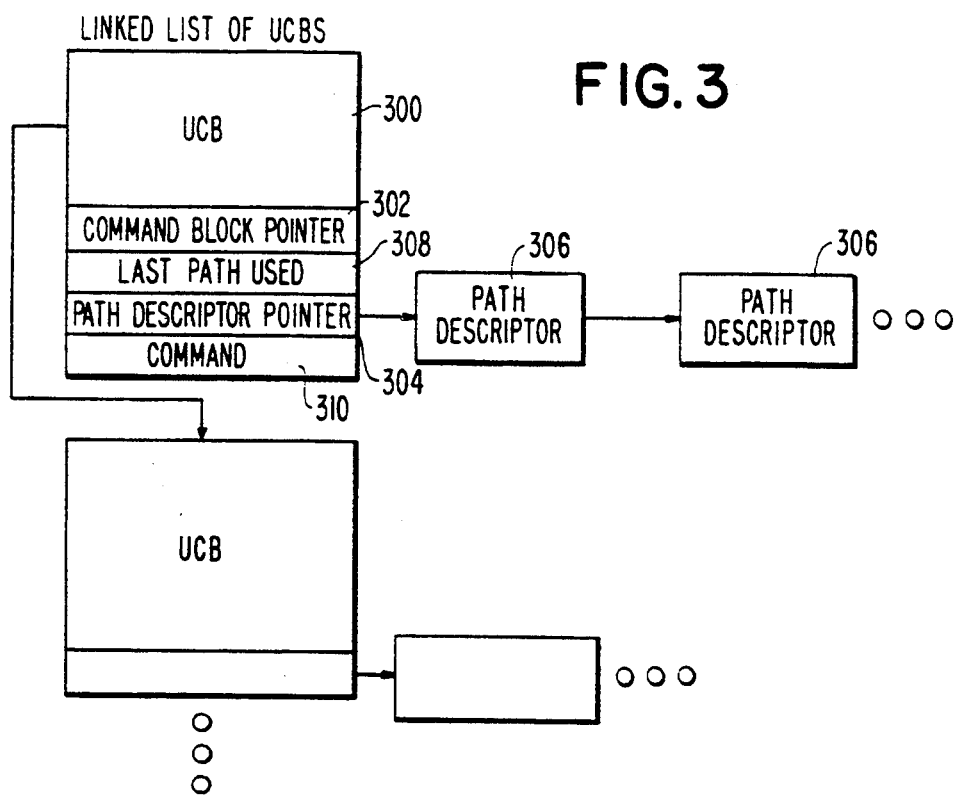
FIGS. 3–5 are block diagrams of illustrative data structures for controlling storage units in accordance with the present invention.

FIG. 3 shows a "Main Processing Unit" UCB. The main processing unit 11-14 controls access to storage units via UCBs linked together in a UCB list. Each Main Processing Unit UCB typically contains: the storage unit characteristics 300 (e.g., storage unit speed, size, name, and error statistics); a pointer 302 to a list of active commands for that storage unit; a pointer 304 to a list of "path descriptors" 306 for that storage unit; an indicator 308 of the path used to send the last command for the storage unit; and the command 310 sent.

A path descriptor describes a particular path that main processing unit 11-14 can use to access the storage unit. The path includes a port 119 through which the main processing unit can access the storage unit, and the controller address for the storage unit. The path descriptor includes: a path address (e.g., the node address of controller 15-20); statistics (e.g., the number of times the path has been used, and the number of outstanding commands); and a path state (ONLINE/OFFLINE/AVAILABLE). The state of a path descriptor indicates whether the path is currently usable for sending commands to the storage unit.

A storage unit cannot be used by a main processing unit until the storage unit is brought to the ONLINE state. The unit state is "AVAILABLE" if the storage unit is available along any path, "ONLINE" if the main processing unit has successfully executed an "Online" command through any available path, and "OFFLINE" if the storage unit is not AVAILABLE or ONLINE through any path. A storage unit is ONLINE to the main processing unit if it is ONLINE through any path, but the main processing unit must only communicate with the storage unit through the paths that have been brought to the ONLINE state. It is therefore important to identify all paths for which the storage unit is ONLINE.

It is important that path information be created and maintained inside the various UCBs. Many processes are built around algorithms in which various commands, responses, and attention messages are exchanged between various components of system. A "command" is a message that is sent from a higher level component (e.g., main processing unit 11-14) to a lower level component (e.g., controller 15-20) to request an operation. A "response" is a message from a lower level component to a higher level component to signal information about completion of a requested operation (i.e., in response toga command). An "attention message" is a message from a lower level component to a higher level component which is not in response to a command.

The commands described below are used to either change or monitor information in either a Controller UCB or Device Set UCB. The "Online" command sets the state of a unit/path in a Controller or Device Set UCB to ONLINE. The "Get Unit Status" command polls controller 15-20 for information (contained in the Controller UCB) about storage units connected to the controller. The "Get Available Units" command obtains information about the storage units from device sets 100-104. The "Determine Access Path" command is used to gather information about available paths to storage units.

The attention messages described below are used by a lower level component to signal a higher level component about some unit/path state information. The "Unit Present" attention message is used to signal the presence of, and to pass information about, a storage unit in a device set to a controller 15-20. The "Available" attention message signals the presence of, and passes information about, a storage unit to main processing unit 11-14. An "Access Path" attention message signals to a controller or main processing unit the presence of a path to a storage unit.

Figure 4:
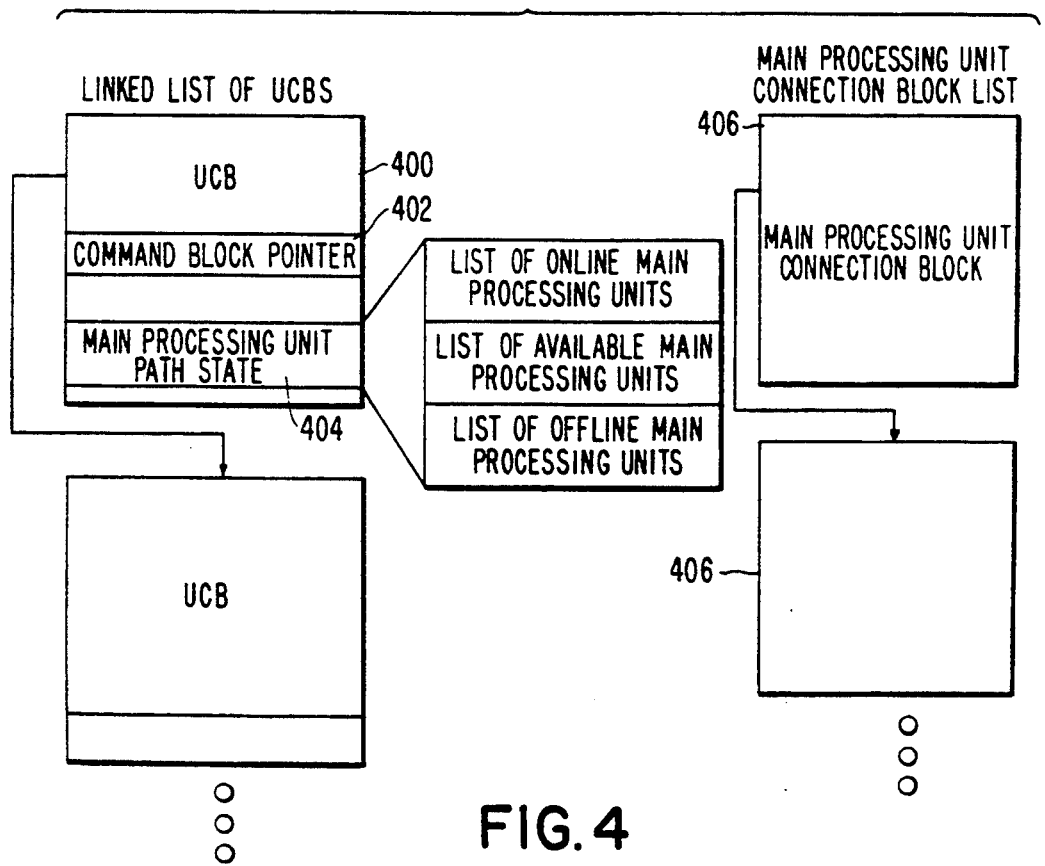

FIG. 4 shows a "Controller" UCB for controlling storage units and paths from main processing units 11-14 to storage units connected to the controller. Like the main processing unit, controller 15-20 also controls access to storage units via UCBs linked together in a UCB list. Each controller UCB typically includes: the storage unit characteristics 400 (e.g., unit speed, size, name, and error statistics); a pointer 402 to a list of active commands for that storage unit; and an indicator 404, for every main processing unit, of the state of the path from main processing unit 11-14 to the storage unit.

Controller 15-20 controls communications with each main processing unit via data structures known as "Main Processing Unit connection blocks." Each controller 15-20 maintains a separate Main Processing Unit connection block 406 for each main processing unit to which it is connected. The Main Processing Unit connection block, among other things, includes: the address of the main processing unit; the identifier of the software process communicating with the controller; the state of the connection to the main processing unit process (e.g., Connected, Not Connected), which indicates whether the controller and the main processing unit process are currently connected to each other.

Figure 5:
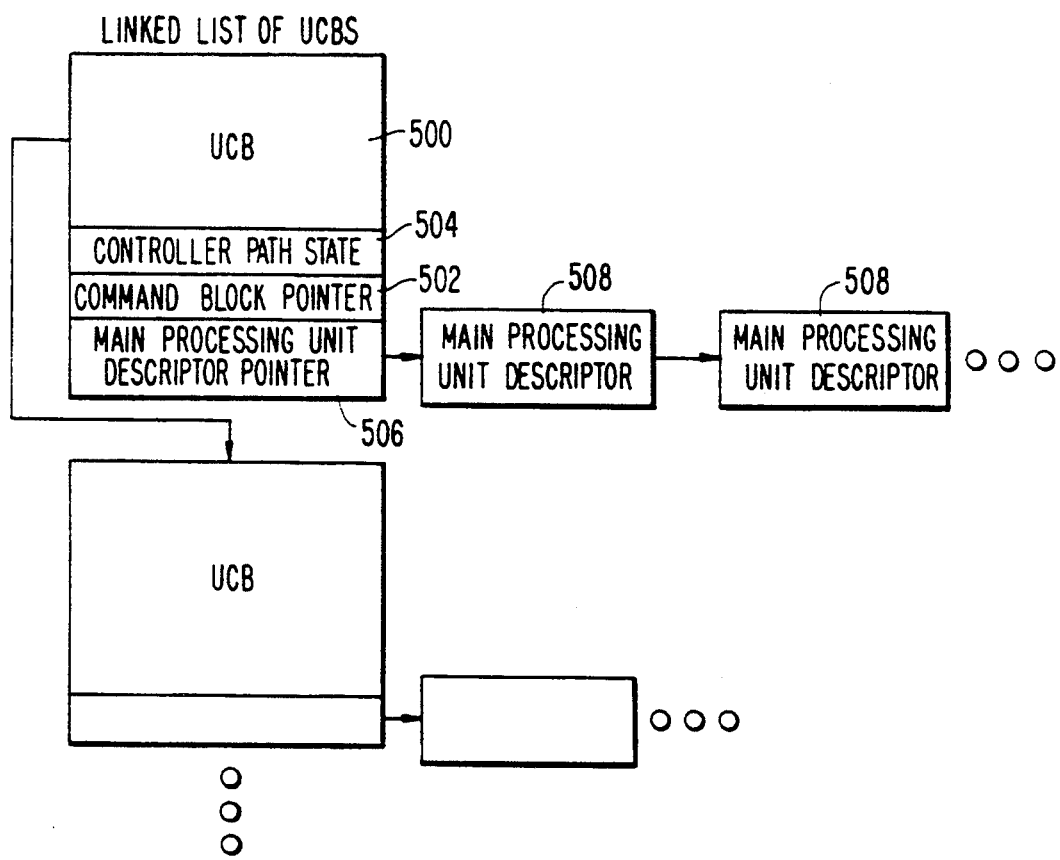

Device sets 100-104 also control access to storage units via UCBs grouped in a linked list. Each "Device Set" UCB (shown in FIG. 5) includes: the storage unit characteristics 500 (e.g., unit speed, size, name, and error statistics); a pointer 502 to a list of outstanding commands for that storage unit; a path state 504 (online, available, offline) for each controller, indicating whether any main processing unit has set the storage unit online, or if none are online, whether any main processing units have set the storage unit available, through that controller; and a pointer 506 to a list of main processing unit descriptors 508. Each main processing unit descriptor contains an identifier for that main processing unit (e.g., the node address of the main processing unit port), and the state of the path to that main processing unit through each controller 15-20 (e.g., ONLINE, AVAILABLE, or OFFLINE).

Figure 6:
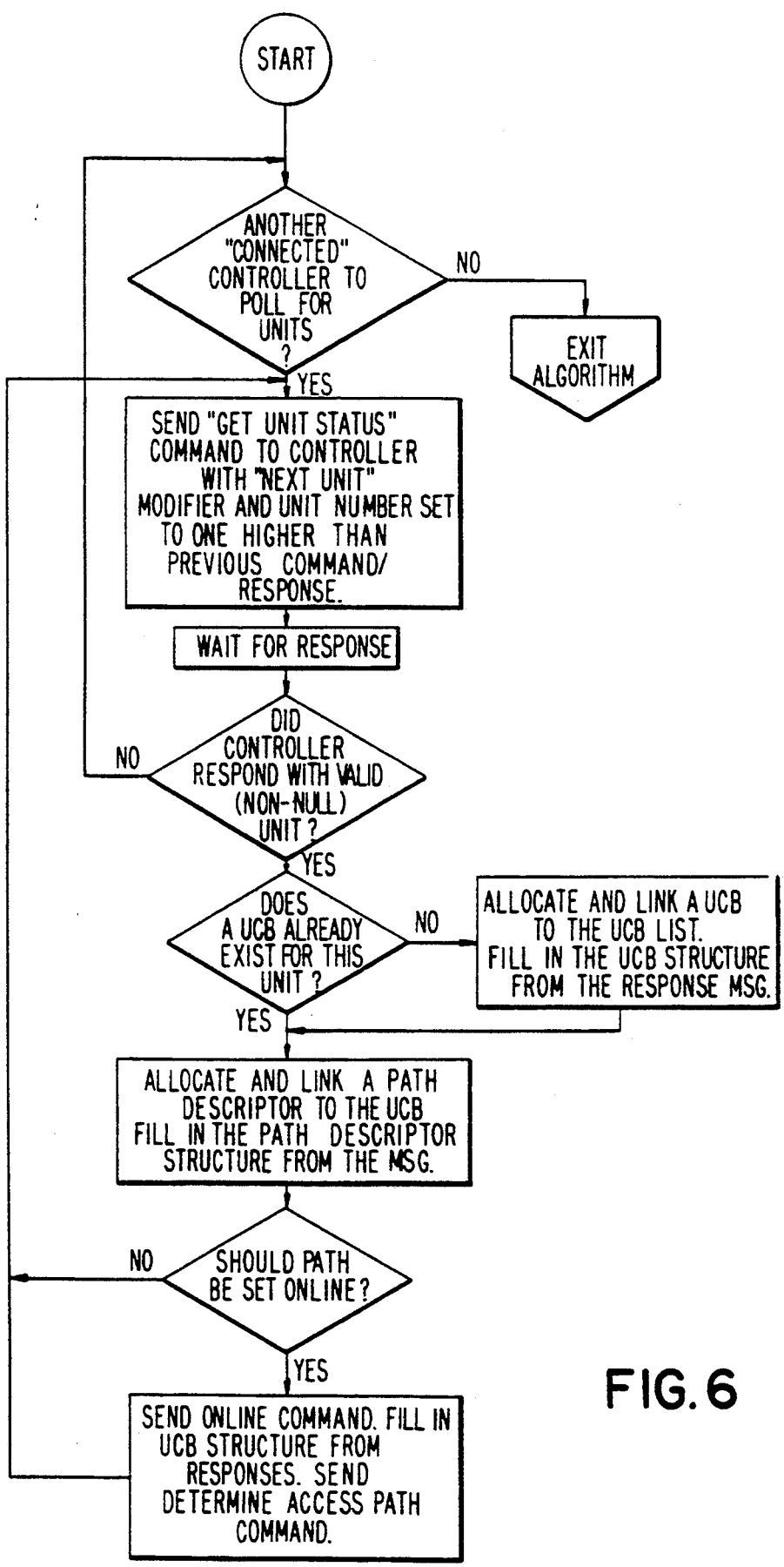
FIGS. 6–8 are flow charts of illustrative procedures for determining, at initialization, the system components which may be accessed by a main processing unit, a port controller, and a controller, respectively.
Figure 7:
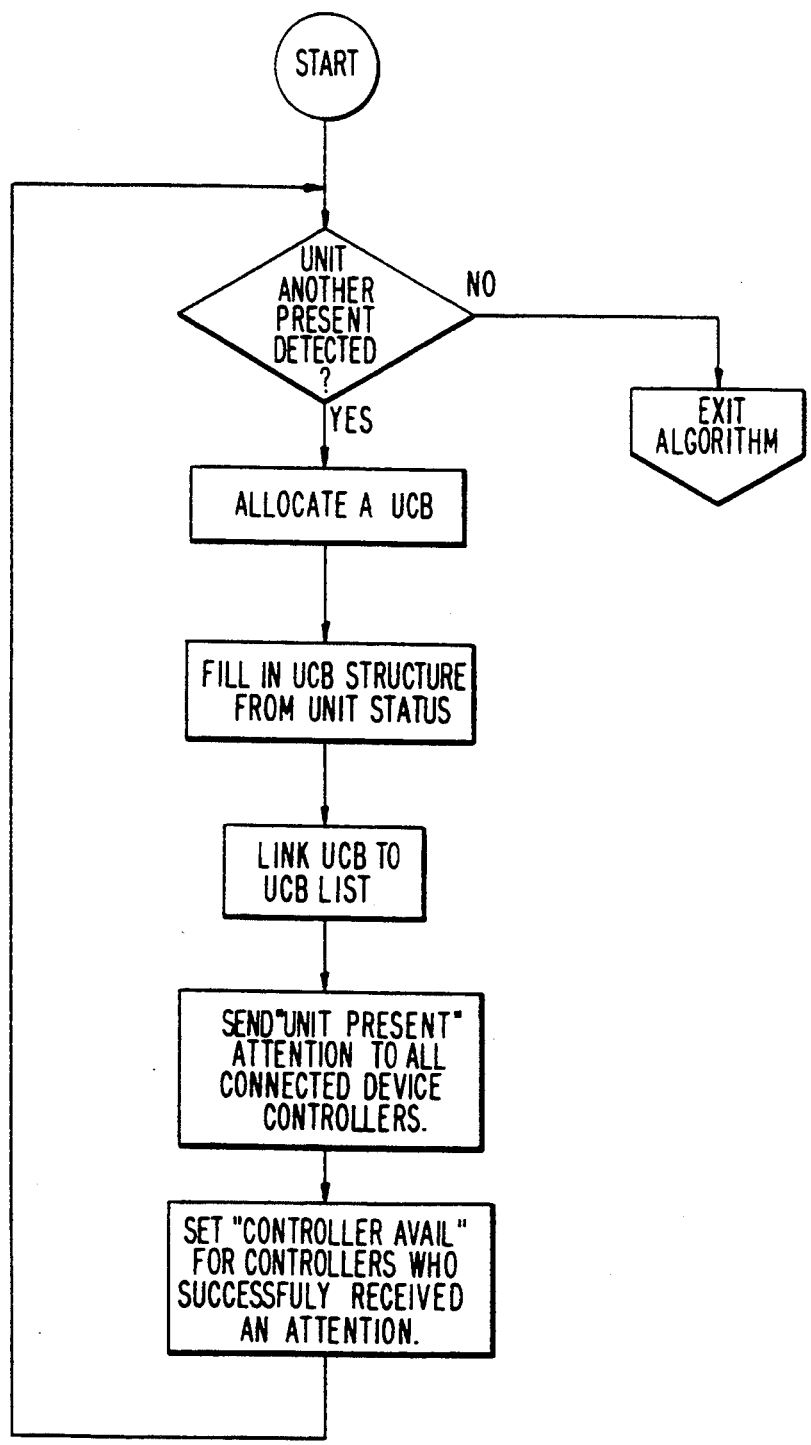
Figure 8:
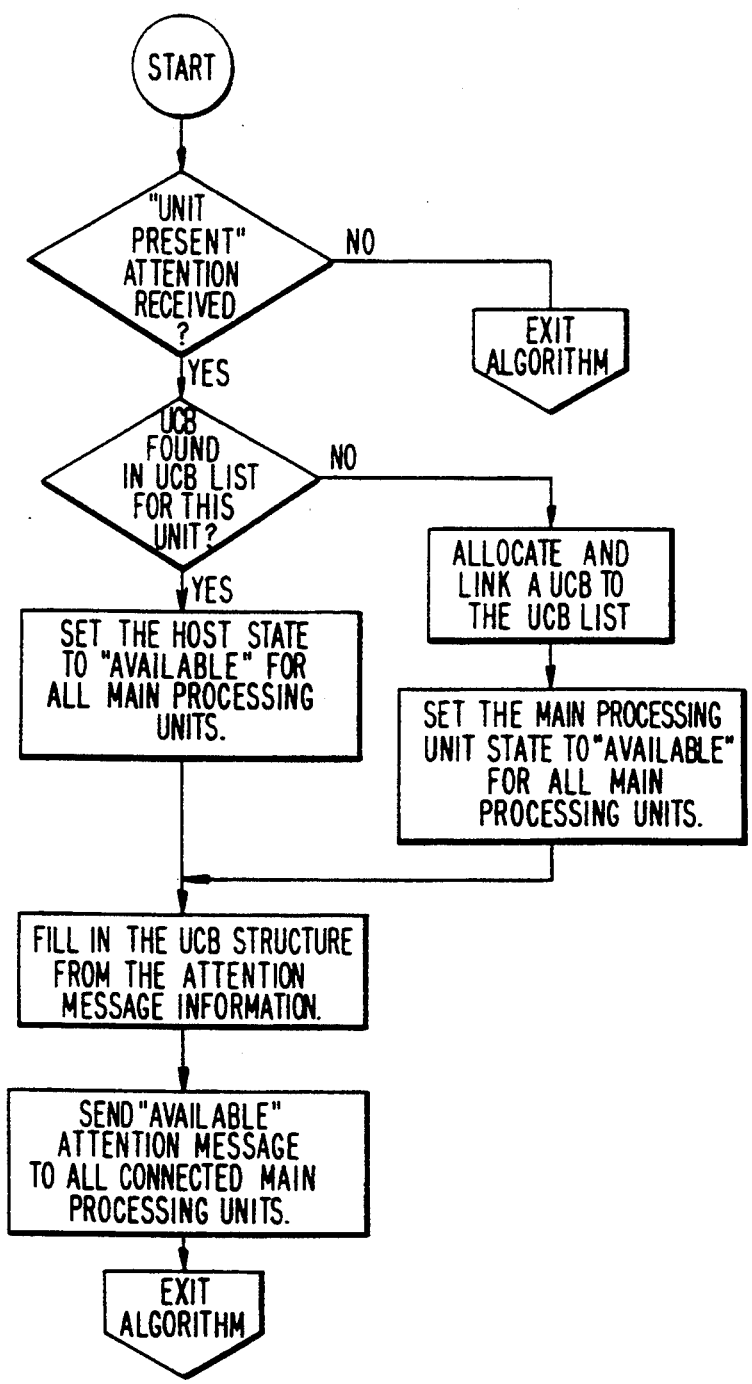

FIGS. 6-8 illustrate the procedures implemented at initialization by main processing unit 11-14, controller 15-20, and port controller 220, respectively, for determining which components of the system it may access.

Referring now to FIG. 6, during an operating system boot, main processing unit 11-14 polls each controller 15-20 for available storage units, using conventional polling techniques. As discussed below, the main processing unit brings any available storage units ONLINE to the system, if not inhibited from doing so by a constraint, such as a system generation parameter (e.g., a parameter set by the System Manager).

An input/output driver process "connects" to controllers (i.e., it becomes aware of their presence and initiates communication with them). For each controller thus connected, the driver polls via the "Get Unit Status" command for all storage units connected to that controller that are available to main processing unit 11-14. The "Next Unit" modifier in the command instructs the controller to respond with information about a storage unit whose unit number is greater than or equal to the unit number specified in the command. For each storage unit thus identified, if a UCB is not already built, the driver creates a Main Processing Unit UCB (see FIG. 3 discussed above), and links the new UCB to the UCB list. In either case, the driver also allocates a path descriptor and links it to the new Main Processing Unit UCB.

If not inhibited from doing so, the driver brings the unit/path ONLINE by sending an "Online" command to the controller/unit. The driver also sends a "Determine Access Path" command to the controller/unit, which causes the storage unit to send "Access Path" attention messages through all other available paths, thus signalling alternate paths that may be used to send commands to the storage unit (see FIG. 14-17).

FIG. 7 shows an illustrative procedure initiated by device set 100-104 during a subsystem boot (i.e., a booting of the device set). Device set 100104 identifies the storage unit or storage units to which the devices 205 connected in the device set belong. This can be accomplished by having the system operator first define the configuration of the device set, as set forth, for example, in the above referenced patent application entitled "DATA STORAGE APPARATUS AND METHOD". Information concerning the device set configuration, including information identifying the storage unit to which each device 205 belongs, can be stored at this time on each of devices 205, and can be read by a processor in the device set (e.g., microprocessor 202 of FIG. 2) by polling all devices 205 connected in the device set. For each storage unit thus identified, the device set builds a Device Set UCB (discussed above; see FIG. 5) and links it to the Device Set UCB list. Device set 100-104 then sends a "Unit Present" attention message to all controllers 1520 to which it is connected. For each controller that successfully receives the attention message, device set 100-104 flags the storage unit as being "AVAILABLE" to that controller 15-20, in the controller path state of its Device Set UCB.

FIG. 8 shows an illustrative procedure initiated by controller 15-20 upon receiving a "Unit Present" attention message indicating "AVAILABLE" from device set 100-104. Upon receiving the attention message, controller 15-20 determines whether a Controller UCB (discussed above; see FIG. 4) has already been built for the storage unit indicated as present. If a Controller UCB does not exist, controller 15-20 creates one for the storage unit and links it to the Controller UCB list.

Once controller 15-20 allocates a Controller UCB, the controller sets the storage unit state to AVAILABLE for all main processing units 11-14, and updates the fields in the Controller UCB with information received in the attention message. Controller 15-20 also announces to all connected main processing units 11-14 the availability of the storage unit through that controller. It does so by sending AVAILABLE attention messages to each of connected main processing units 11-14.

Figure 9:
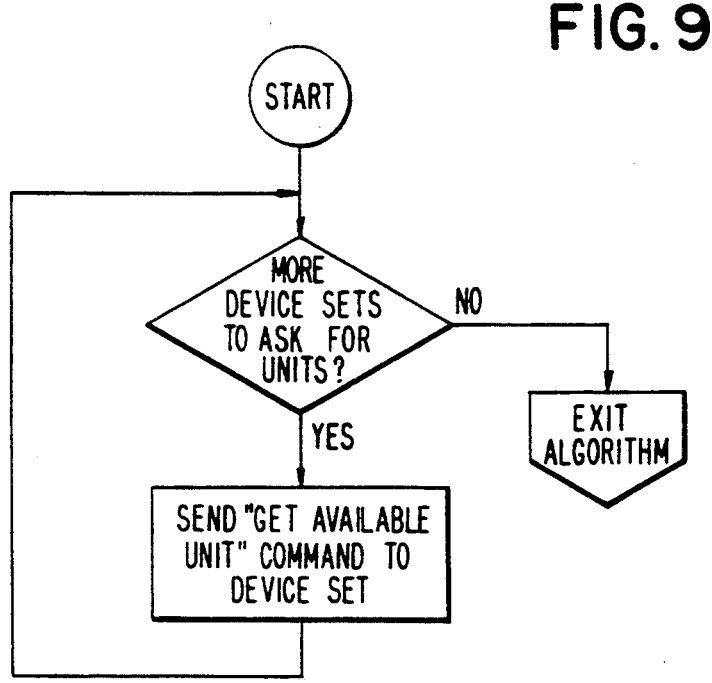
FIGS. 9–10 are flow charts of illustrative procedures for controller unit polling, and the port controller response to that polling.
Figure 10:
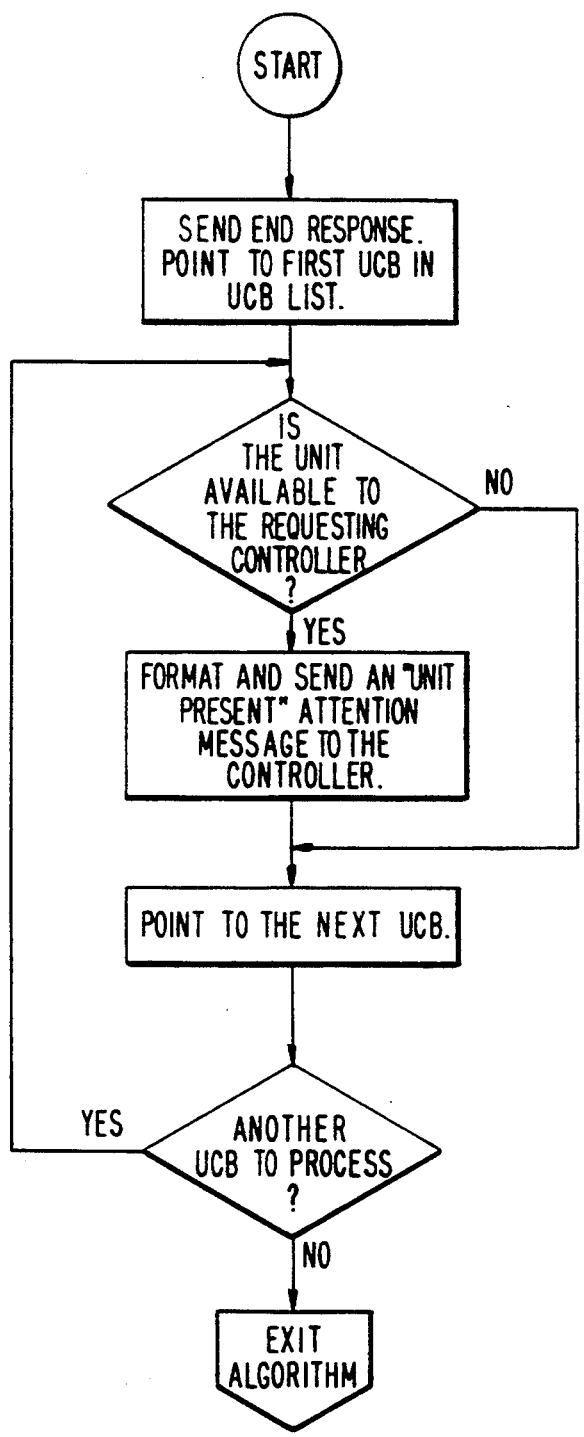

FIGS. 9 and 10 show illustrative flow charts of procedures for ensuring that UCBs are built for each storage unit, regardless of which system components "power on" first. For example, if a given controller 15-20 powers on after main processing unit 11-14, a Main Processing Unit UCB may not be created for storage units connected through that controller. To prevent this, controller 15-20, during its subsystem boot, typically sends a "Get Available Units" command to each device set 100–104 to which it is connected (see FIG. 9). This polling procedure is analogous to main processing unit 11–14 polling all controllers 15–20 (FIG. 6).

Device set 100–104 responds to the "Get Available Units" command (see FIG. 10) by scanning through its list of UCBs. Device set 100–104 sends a "Unit Present" attention message (similar to the message it sends at device set initialization—see FIG. 7) to the requesting controller for each AVAILABLE unit. Thus, both controller 15–20 and device set 100104 initiate "Available" attention messages (sent to main processing unit 11–14) when they initialize, ensuring that the main processing unit is always notified of the availability of the storage unit.

Figure 11:
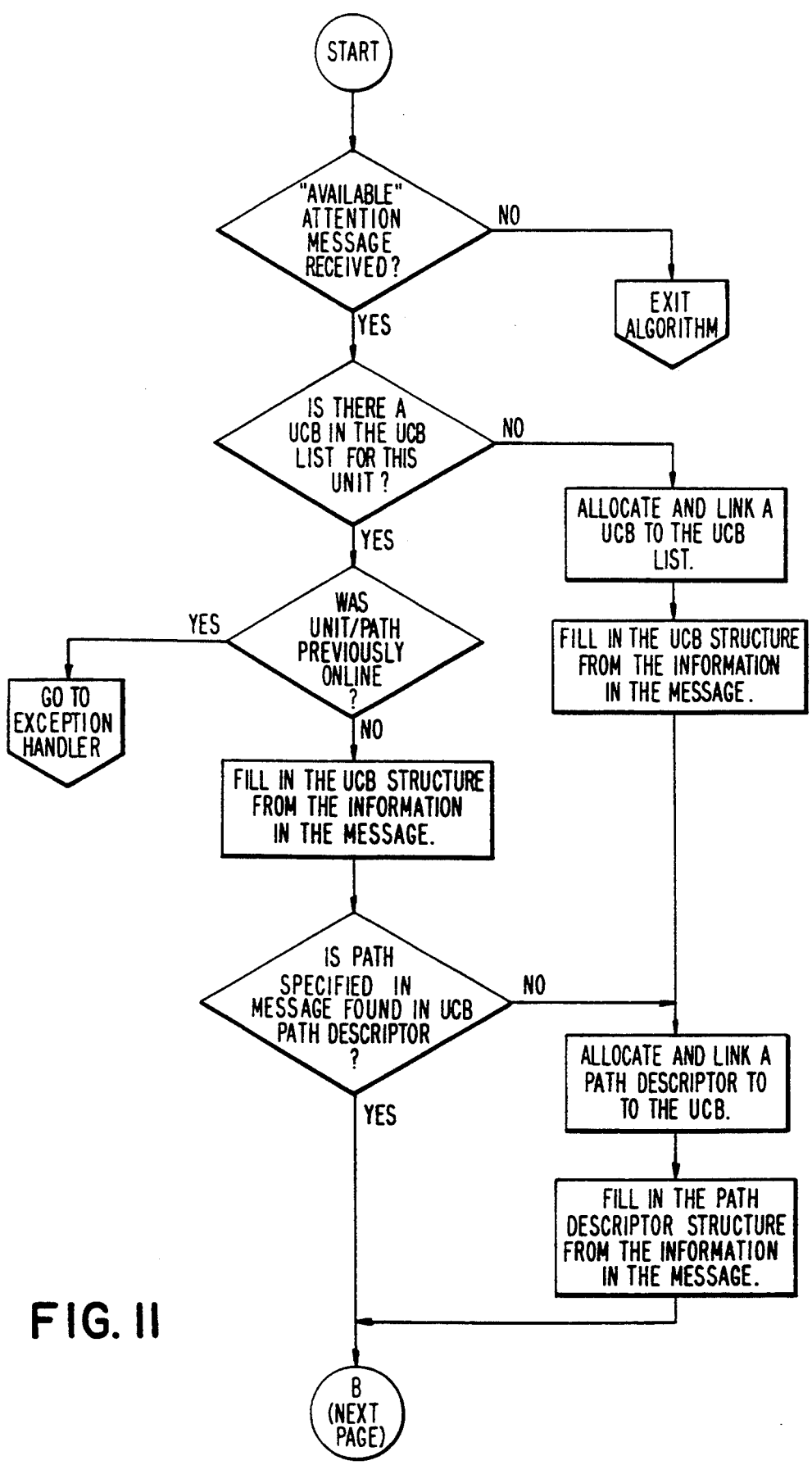
FIGS. 11–12 are flow charts of illustrative procedures for determining, after initialization, the controllers and storage units which may be accessed by a main processing unit.
Figure 12:
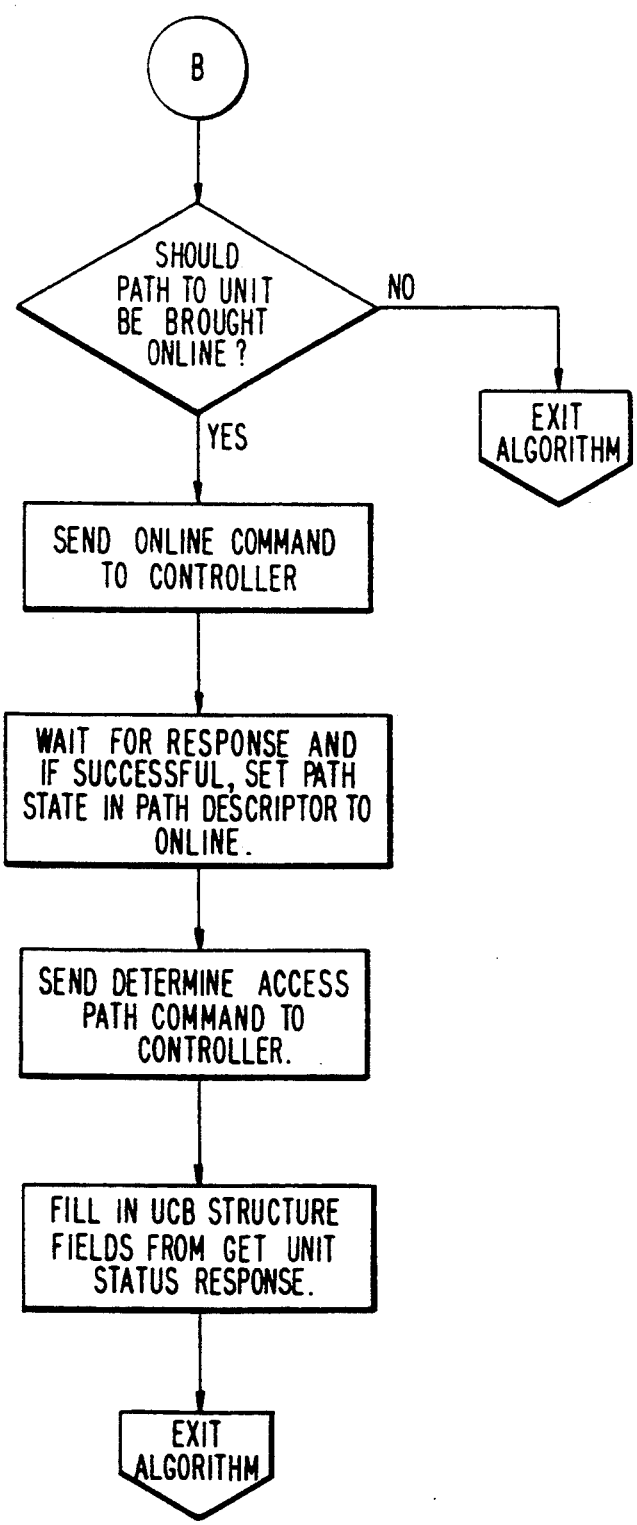

As described above, storage units may become available to main processing unit 11–14 after the main processing unit initializes (see FIGS. 7–10). FIGS. 11 and 12 illustrate a process by which main processing unit 11–14 creates a Main Processing Unit UCB after receiving an "Available" attention message.

Main processing unit 11–14 typically "learns about" a storage unit when it receives an "Available" message from the storage unit. Upon receipt of such a message, the main processing unit determines whether a Main Processing Unit UCB already exists for that storage unit. If not, main processing unit 11–14 allocates and links a UCB for the storage unit. The main processing unit also allocates and links a path descriptor describing the path from which the attention message was received. If a UCB already existed, and there was no path descriptor built for that path, the main processing unit creates a path descriptor for that path.

If a Main Processing Unit UCB already existed and a path descriptor was already built for the path, and the storage unit was ONLINE through that path, the storage unit has gone through an asynchronous state change (such as re-initialization). This typically may cause an error report to be generated or may cause another exception processing to take place.

Unless inhibited from doing so, main processing unit 11–14 then brings the storage unit and the path ONLINE, by sending an "Online" command to the controller/unit. Main processing unit 11–14 also sends a "Determine Access Path" command (described below) to the controller/unit, causing the storage unit to signal alternate paths that may be used by main processing unit 11–14 to access the storage unit.

Figure 13:
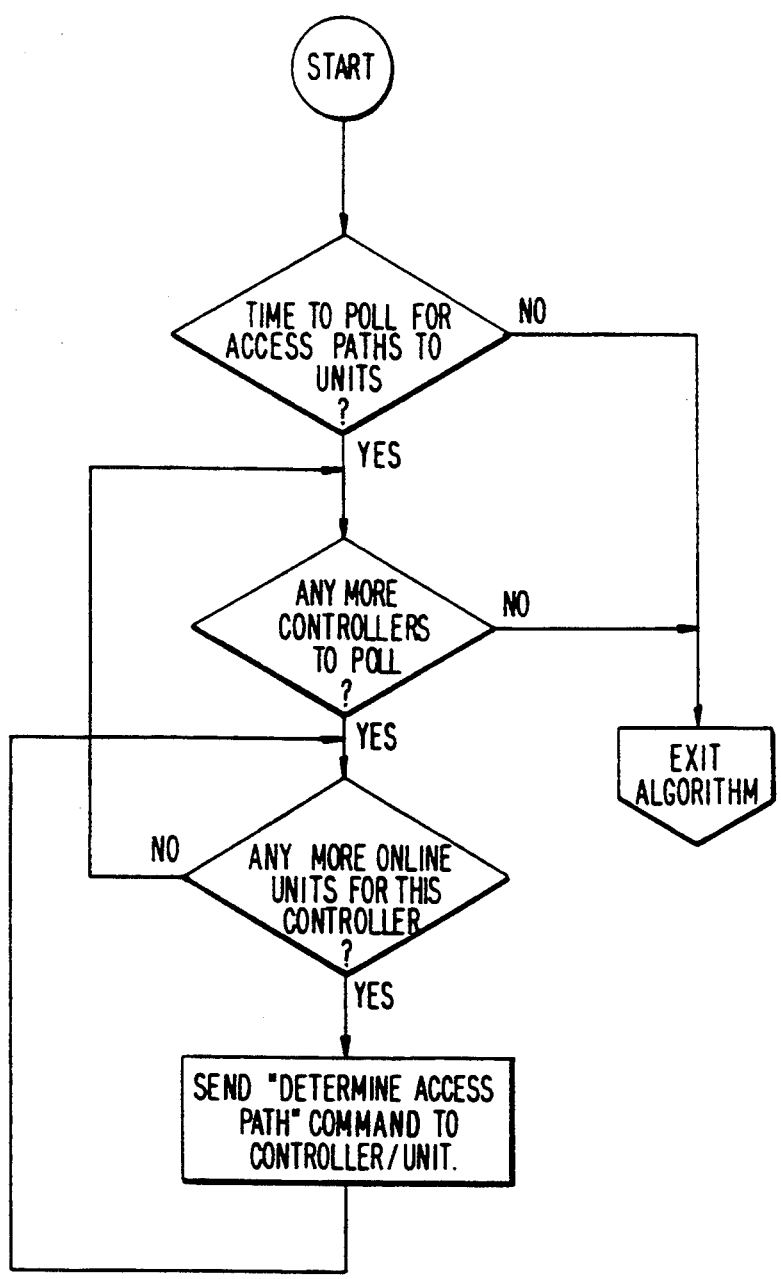
FIGS. 13–17 are flow charts of an illustrative process for determining alternative access paths between a main processing unit and a storage unit.

To provide the greatest flexibility in transferring data between main processing unit 11–14 and storage units, main processing unit 11–14 issues a "Determine Access Path" command to all ONLINE storage units. The main processing unit typically issues this command upon initialization. However, to ensure that main processing unit 11–14 has information about all available access paths to a storage unit, it periodically sends a "Determine Access Path" command to each ONLINE storage unit (see FIG. 13). Referring now to FIGS. 14–17, the system components respond to a main processing unit "Determine Access Path" command as described below.

Figure 14:
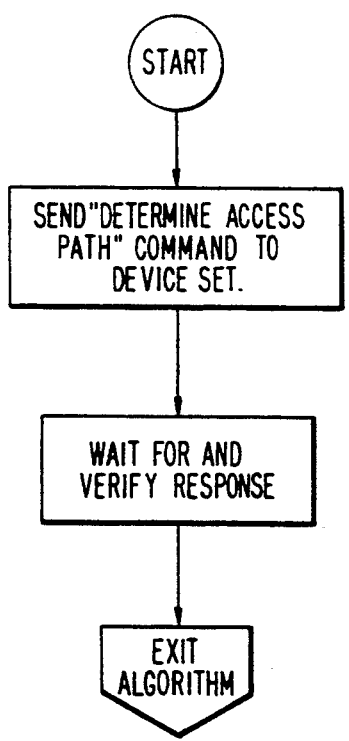
Figure 15:
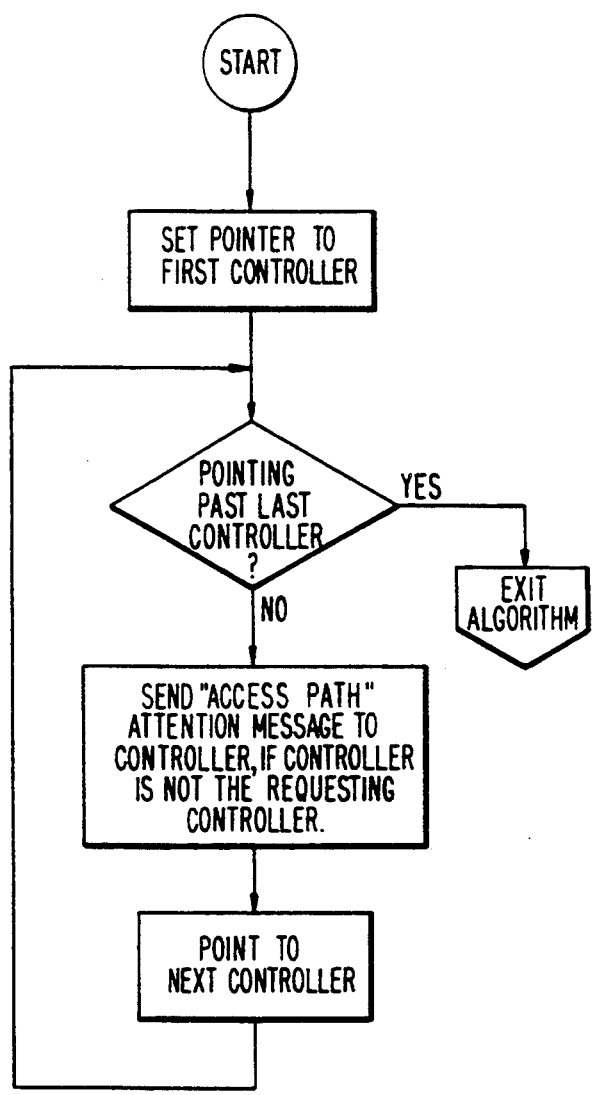
Figure 16:
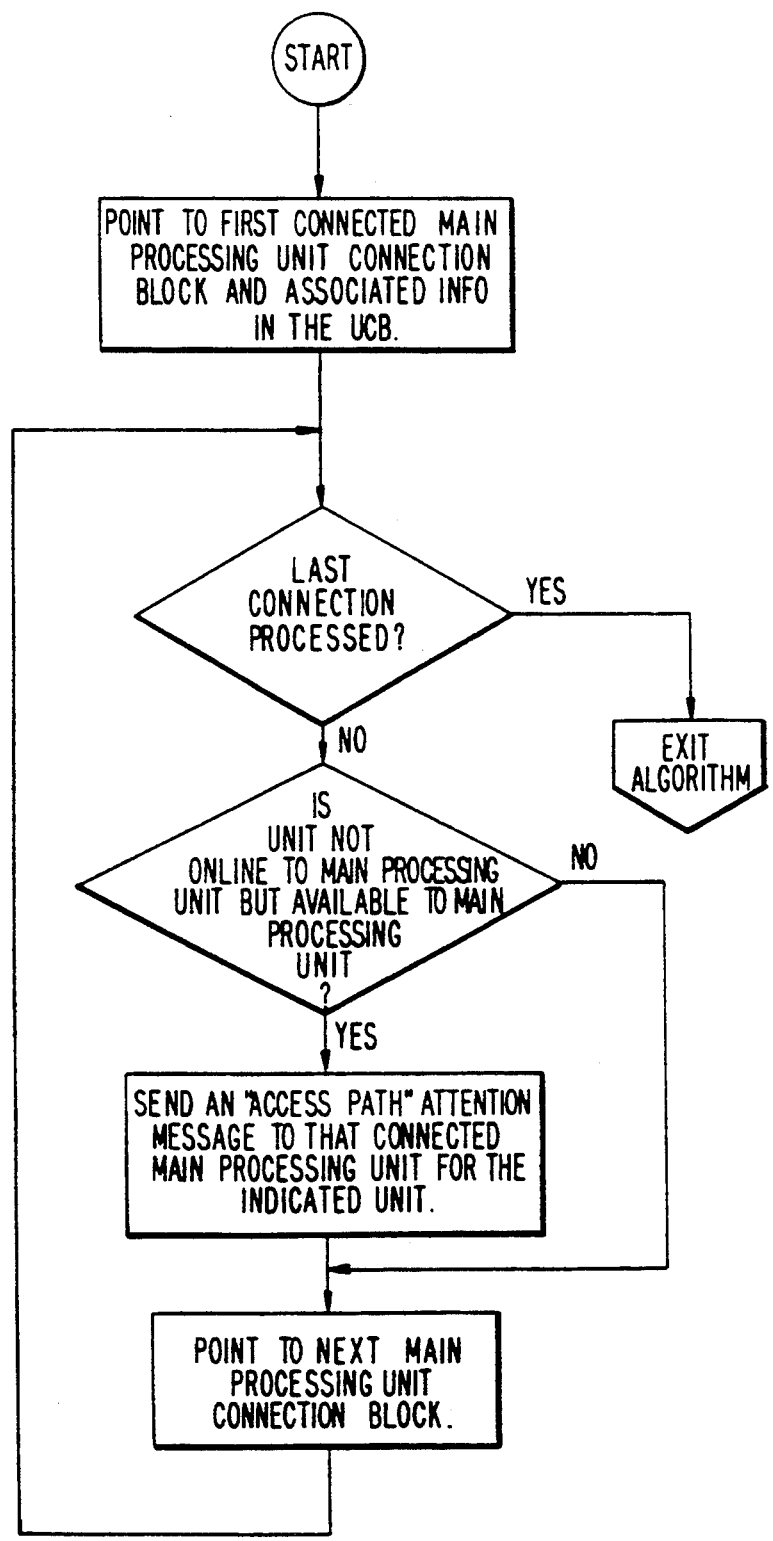
Figure 17:
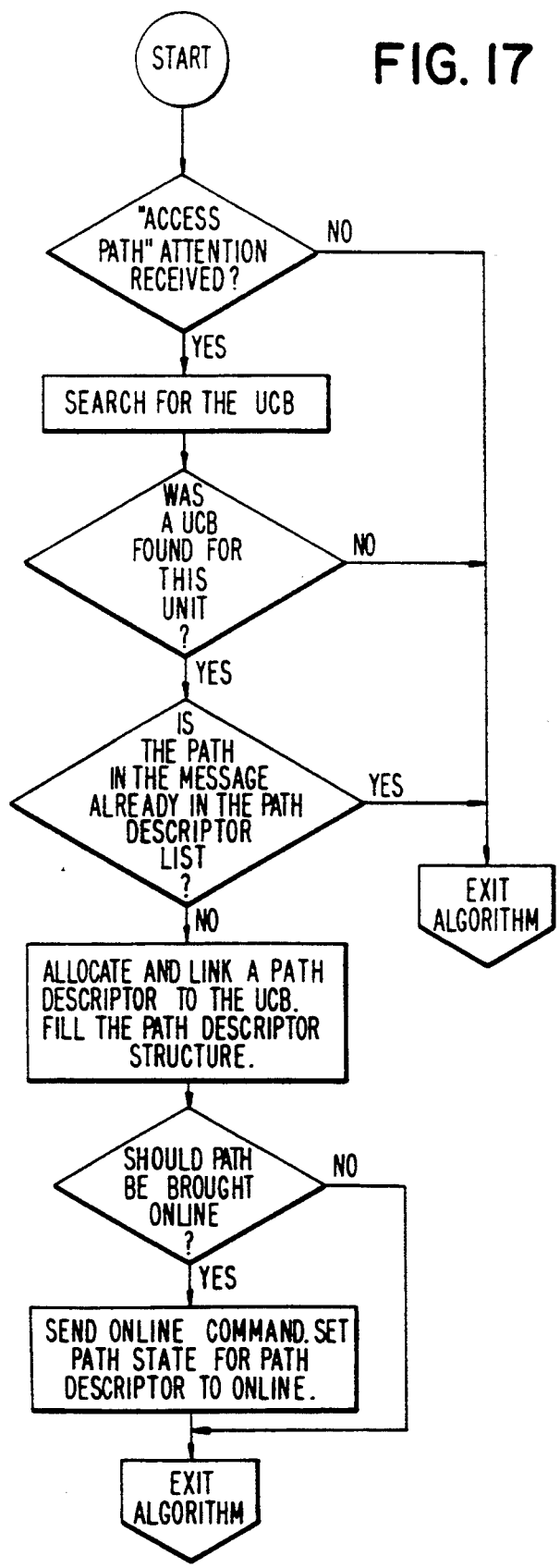

Upon receipt of the "Determine Access Path" command, controller 15–20 forwards the "Determine Access Path" command to the appropriate device set 100–104 (FIG. 14). Device set 100–104 responds by sending an "Access Path" attention message (FIG. 15) to each controller 15–20 to which the device set is connected (except the controller that sent the command).

Each controller 15–20, upon receipt of this message, sends an "Access Path" attention message (FIG. 16) to all connected main processing units 11–14 that have set the particular indicated storage unit to AVAILABLE, but not yet ONLINE. (The controller can determine which main processing units have set the storage unit to AVAILABLE, but not ONLINE, from information in the Controller UCB).

Each main processing unit 11–14, after receiving the "Access Path" attention message (FIG. 17), searches for the Main Processing Unit UCB corresponding to the indicated storage unit. Main processing unit 11–14 ignores the attention message if it cannot locate the UCB, or if it locates the UCB but there is already a path descriptor for the indicated path. If main processing unit 11–14 locates a UCB for the designated storage unit, and the indicated path is new, the main processing unit builds a path descriptor and links it to the UCB. If the path should be brought ONLINE, the main processing unit sends an "Online" command to the indicated controller/unit, and the path state is set to ONLINE (see FIGS. 18 and 19, described below).

Figure 18:
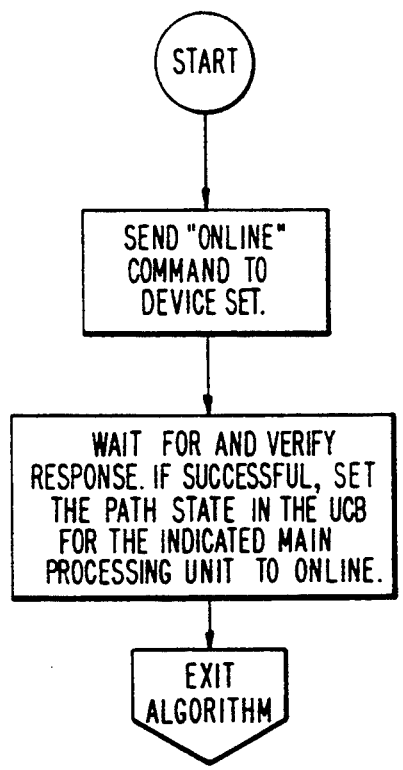
FIGS. 18–19 are flow charts of illustrative controller and port controller responses, respectively, to an "On-line" command.
Figure 19:
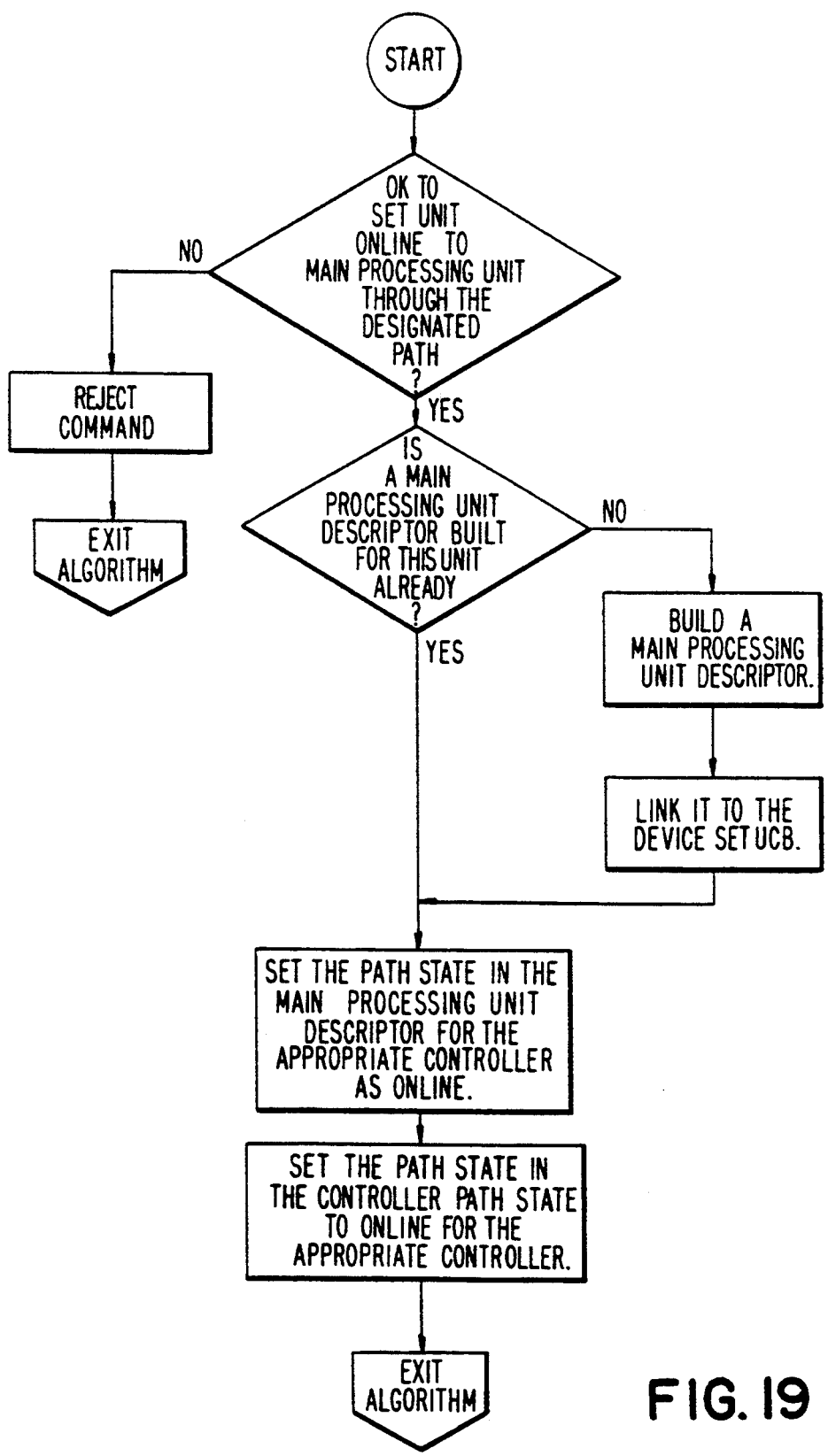

Referring now to FIGS. 18 and 19, upon receiving an "Online" command from main processing unit 11–14, controller 15–20 forwards the command to the appropriate device set 100–104. Device set 100–104 determines whether the storage unit can be brought ONLINE to main processing unit 11–14. If the storage unit can be brought ONLINE, device set 100–104 determines whether a Main Processing Unit descriptor is built for this main processing unit, builds the descriptor if it does not exist, and links it to the Device Set UCB. Device set 100–104 then sets the controller path state to the appropriate controller as ONLINE, sets the unit path state in the main processing unit descriptor as ONLINE, and sends a successful response to the controller. Controller 15–20, in turn, sets the path state for the appropriate main processing unit 11–14 to ONLINE.

Figure 20:
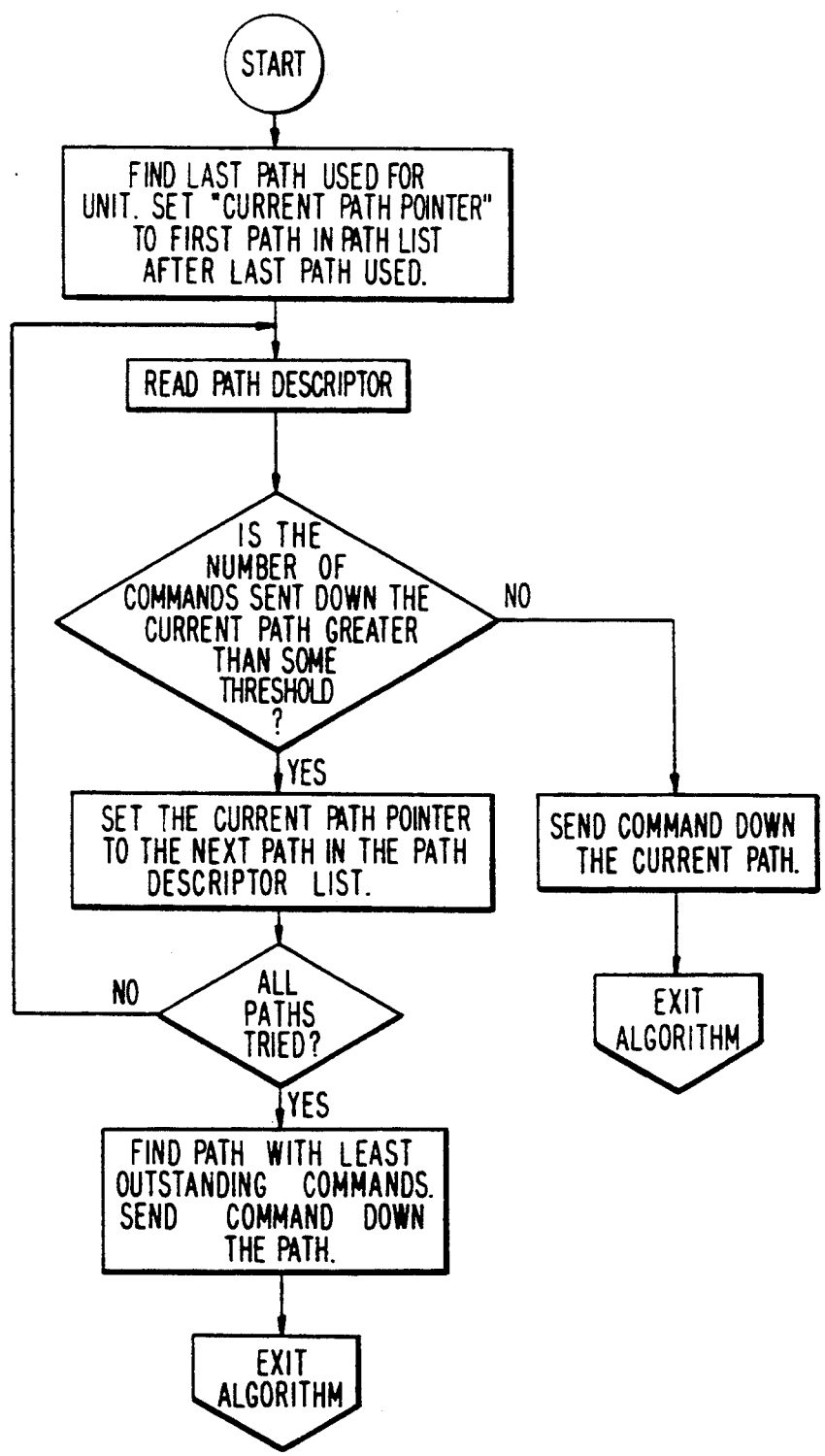
FIG. 20 is an illustrative main processing unit algorithm for choosing a path for sending a command, in accordance with the principles of the present invention.

FIG. 20 shows an illustrative embodiment of a method for choosing a path for sending a command between main processing unit 11–14 and a storage unit. The method illustrated dynamically balances the load (i.e., transfer of commands) for one storage unit among multiple controllers. The method utilizes a "rotating path" algorithm, in which the path adjacent to the last path used preferably is chosen for transferring the next command.

According to this method, when the path adjacent to the last path used exceeded a threshold in the number of outstanding commands for that storage unit, data is transferred via a different path. In this case, the load is better balanced by choosing another path for the command. However, if all paths have exceeded the threshold, the command is transferred via the path with the least number of outstanding commands.

Thus it is seen that a data processing system is provided that has a multi-port storage device (e.g., a device set) in a network architecture system which can have all of its ports active at any time, and in which a storage device can announce itself without having to deactivate any active ports. One skilled in the art will appreciate that the present invention can be practiced by other than the described embodiments, which are presented for purposes of illustration and not of limitation, and the present invention is limited only by the claims which follow.

What is claimed is:

1. A data processing system comprising:

a plurality of main processing units;

a mass storage device;

a plurality of device controllers connected to said mass storage device to provide interfaces between said mass storage device and said plurality of main processing units; and a data communications link external to said mass storage device interconnecting said plurality of main processing units and said plurality of device controllers in a network configuration; wherein:

said mass storage device includes at least two simultaneously operable means for communicating with said controllers, a first one of said at least two simultaneously operable means connecting said mass storage device to a first one of said plurality of controllers, and a second one of said at least two simultaneously operable means connecting said mass storage device to a second one of said plurality of controllers, said at least two simultaneously operable means and said network in combination providing a plurality of paths which support simultaneous communications between said mass storage device and said plurality of main processing units on different ones of said paths, and at least two paths which support communication between said mass storage device and a particular main processing unit, said data processing system further comprising:

means for allowing said mass storage device to announce to a main processing unit to which it has at least two paths, the availability of said at least two paths, without disabling any of said at least two paths.

2. The data processing system of claim 1 comprising a plurality of mass storage devices.

3. The data processing system of claim 1 wherein said mass storage device includes a plurality of disk drives.

4. The data processing system of claim 1 wherein said mass storage device includes a plurality of floppy disk drives.

5. The data processing system of claim 1 wherein said mass storage device includes a plurality of optical disk drives.

6. The data processing system of claim 1 wherein said mass storage device includes a plurality of tape drives.

7. The data processing system of claim 1 wherein said mass storage device comprises a cache memory.

8. The data processing system of claim 1 wherein said mass storage device includes a set of storage devices interconnected to operate together as a storage unit.

9. A data processing system comprising:

a plurality of main processing units;

mass storage means characterized as a mass storage unit;

a plurality of device controllers connected to said mass storage unit to provide interfaces between said mass storage unit and said plurality of main processing units; and a data communication link external to said mass storage unit interconnecting said plurality of main processing units and said plurality of device controllers in a network configuration; wherein:

said mass storage unit includes at least two simultaneously operable ports by which said mass storage unit communications with said controllers, a first one of said at least two simultaneously operable ports connecting said mass storage unit to a first one of said plurality of controllers, and a second one of said at least two simultaneously operable ports connecting said mass storage unit to a second one of said plurality of controllers, said at least two simultaneously operable ports and said network in combination providing a plurality of paths which support simultaneous communications between said mass storage unit and said plurality of main processing units on different ones of said paths, and at least two paths which support communications between said mass storage unit and a particular main processing unit, said data processing system further comprising:

means for allowing said mass storage unit to announce to a main processing unit to which it has at least two paths, the availability f said at least two paths, without disabling any of said at least two paths.

10. The data processing system of claim 9 wherein said mass storage means includes a set of storage devices interconnected to operate together as a mass storage unit.

11. The data processing system of claim 10 wherein said set of storage devices includes a plurality of disk drives.

12. The data processing system of claim 10 wherein said set of storage devices includes a plurality of floppy disk drives.

13. The data processing system of claim 10 wherein said set of storage devices includes a plurality of optical disk drives.

14. The data processing system of claim 10 wherein said set of storage devices includes a plurality of tape drives.

15. For use in a data processing system comprising a plurality of main processing units, a mass storage device, a plurality of device controllers connected to said mass storage device to provide interfaces between said mass storage device and said plurality of main processing units, and a data communications link external to said mass storage device interconnecting said plurality of main processing units and said plurality of device controllers in a network configuration, wherein said mass storage device includes at least two simultaneously operable means for communicating with said controllers, a data processing method comprising:

connecting said mass storage device to a first one of said plurality of controllers through a first one of said at least two simultaneously operable means and to a second one of said plurality of controllers through a second one of said at least two simultaneously operable means so that said at least two simultaneously operable means and said network in combination provide a plurality of paths which support simultaneous communications between said mass storage device and said plurality of main processing units on different ones of said paths, and at least two paths which support communication between said mass storage device and a particular main processing unit; and allowing said mass storage device to announce to a main processing unit to which it has at least two paths, the availability of said at least two paths, without disabling any of said at least two paths.

16. For use in a data processing system comprising:
a plurality of main processing units,
mass storage means characterized as a mass storage unit,
a plurality of device controllers connected to said mass storage unit to provide interfaces between said mass storage unit and said plurality of main processing units, and
a data communications link external to said mass storage unit interconnecting said plurality of main processing units and said plurality of device controllers in a network configuration, wherein
said mass storage unit includes at least two simultaneously operable ports by which said mass storage unit communicates with said controllers, a data processing method comprising:
  connecting said mass storage unit to a first one of said plurality of controllers through a first one of said at least two simultaneously operable ports and to a second one of said plurality of controllers through a second one of said at least two simultaneously operable ports so that said at least two simultaneously operable ports and said network in combination provide a plurality of paths which support simultaneous communications between said mass storage unit and said plurality of main processing units on different ones of said paths, and at least two paths which support communication between said mass storage unit and a particular main processing unit; and
  allowing said mass storage unit to announce to a main processing unit to which it has at least two paths, the availability of said at least two paths, without disabling any of said at least two paths.

* * * * *